(12) United States Patent
Rudland et al.

(10) Patent No.: US 8,542,828 B2
(45) Date of Patent: Sep. 24, 2013

(54) CRYPTOGRAPHIC SECRET KEY DISTRIBUTION

(75) Inventors: Philip Andrew Rudland, Sunderland (GB); Bas Driesen, Mierlo (NL); Philip Anthony Jamieson, Dorking (GB)

(73) Assignee: Koninklijke Philips N.V., Eindhoven (NL)

( * ) Notice: Subject to any disclaimer, the term of this patent is extended or adjusted under 35 U.S.C. 154(b) by 123 days.

(21) Appl. No.: 13/058,556

(22) PCT Filed: Aug. 6, 2009

(86) PCT No.: PCT/IB2009/053427
§ 371 (c)(1),
(2), (4) Date: Feb. 11, 2011

(87) PCT Pub. No.: WO2010/018493
PCT Pub. Date: Feb. 18, 2010

(65) Prior Publication Data
US 2011/0135088 A1    Jun. 9, 2011

(30) Foreign Application Priority Data
Aug. 14, 2008 (EP) .................................. 08162396

(51) Int. Cl.
*H04L 9/00* (2006.01)
(52) U.S. Cl.
USPC .......................................................... 380/46

(58) Field of Classification Search
USPC ............................................................ 380/46
See application file for complete search history.

(56) References Cited

U.S. PATENT DOCUMENTS

| | | | |
|---|---|---|---|
| 5,341,427 A * | 8/1994 | Hardy et al. | 380/273 |
| 5,515,439 A | 5/1996 | Bantz et al. | |
| 6,182,214 B1 | 1/2001 | Hardjono | |
| 6,487,660 B1 * | 11/2002 | Vanstone et al. | 713/168 |
| 7,177,424 B1 * | 2/2007 | Furuya et al. | 380/37 |
| 2006/0067533 A1 * | 3/2006 | Yanovsky | 380/278 |
| 2011/0055585 A1 * | 3/2011 | Lee | 713/183 |

FOREIGN PATENT DOCUMENTS

| | | |
|---|---|---|
| EP | 0625764 A2 | 11/1994 |
| WO | 2007031089 A1 | 3/2007 |

OTHER PUBLICATIONS

Zigbee RF34CE Specification: Version 1.00, Document 094945r00ZB, Mar. 2009, 101 Page Document.

* cited by examiner

*Primary Examiner* — Kambiz Zand
*Assistant Examiner* — Stephen Sanders

(57) ABSTRACT

The present invention relates to cryptographic secret key distribution, wherein a value for a number of iterations can be individually set, so that the number of messages to be exchanged during generating a cryptographic secret key can be varied based on the set value of the iteration number.

13 Claims, 12 Drawing Sheets

CRYPTOGRAPHIC SECRET KEY DISTRIBUTION

FIELD OF THE INVENTION

The present invention generally relates to cryptographic secret key distribution between a transmission side and a receiving side.

BACKGROUND OF THE INVENTION

WO 2007/031089 discloses a method for secure communication in a wireless communication system. In a key generation mode, an access point equipped with an ESPAR antenna forms a beam pattern and sends a packet for measurement. The terminal receives that packet with an omnidirectional pattern and acquires a Received Signal Strength Indication (RSSI) value after averaging in order to equalize the influence of noise. Next, a packet for measurement is transmitted using the omnidirectional pattern by the regular user. The access point receives that packet by a pattern, which is identical to the original pattern, and acquires the RSSI value after averaging. There are K different RSSI values acquired by repeating the measurement of the RSSI K times and changing the beam pattern of the access point. An iteration K is simply set according to key length. Next, a threshold value is set up for the RSSI value of the K pieces, and it becomes 1, if it is higher than a threshold value and 0 if it is under the threshold value. After binarization, the same key is generated in the access point and the regular user, and key agreement can be achieved.

In wireless communication systems, secret-key cryptography is used because its processing speed can deal with bulk data. Secret-key cryptography is sometimes referred to as symmetric cryptography. It is a traditional form of cryptography, in which a single key can be used to encrypt and decrypt a message. Secret-key cryptography not only deals with encryption, but it also deals with authentication. One such technique is called message authentication codes (MACs). The encryption key is trivially related to the decryption key, in that they may be identical or there is a simple transformation to go between the two keys. The keys, in practice, represent a shared secret between two or more parties that can be used to maintain a private information link. An advantage of secret-key cryptography is that it is generally faster than public-key cryptography.

Other terms for symmetric-key encryption are secret-key, single-key, shared-key, one-key and private-key encryption. However, use of the latter term conflicts with the term private key in public-key cryptography.

A major problem with secret-key cryptosystems is getting the sender and receiver to agree on the secret key without anyone else finding out. This requires a method by which the two parties can communicate without fear of eavesdropping. An important question is thus how to achieve the initial key exchange.

A first approach resides in the use of bi-directional LQI/RSSI (link quality indicator/received signal strength indicator) measurements to assess variations of the attenuation of the signal path between two transceivers, in order to establish a shared secret between two nodes. Thanks to the reciprocity theorem of radio wave propagation between two communication parties, it is possible for them to calculate common information by using the fluctuation characteristics of the channels. This approach can provide a secret key agreement scheme without any key distribution processes. Because this scheme can provide a onetime key when it is needed, it is an excellent method to solve the problems of key distribution and key management.

A second approach resides in the sending of a set of random numbers, optionally at low transmit power, and combining (e.g. XOR) them all together to generate a "key". An attacker is unlikely to hear all of them correctly.

The first approach has an optional variant in which the established shared secret is used to secure a 128-bit random key generated by one of the devices. This helps to protect against future attacks against the amount of "randomness" in the attenuation of the signal. Additionally, the first approach makes it difficult for an attacker to get the keys because the attacker's receiver will have a different path attenuation between itself and each of the targets to that that they have between one another. As such the link quality figures (LQI, typically assessed as received signal strength indication, RSSI) assessed in each direction between the two nodes will be strongly correlated, whereas LQI/RSSI to a $3^{rd}$ node will typically be very weakly correlated.

The second approach makes it difficult for an attacker to get the keys because they would either need to have a radio receiver device very nearby and specifically configured to be snooping the right channel at the time of the installation. Nevertheless, one of the risks with the second approach (combining multiple keys) is that attackers might leave a snooping device running all the time, possibly with a high quality receiver. They could then trawl through log files later and may, if they are lucky, receive all the keying information. This may optionally be mitigated by transmissions being at low transmit power, hopefully reducing the risk of attacks to a level that manufacturers are content to deploy products using it.

However, both approaches have a weakness in that they require a lot of transactions to generate a key that is strong enough for use in all cases. For example, the first proposal might require an exchange of 300 messages to give 128-bit security. For many applications this is excessive. A particular example of an application where this would be unsuitable is an energy scavenging device. It is becoming possible for devices, such as light switches, to generate sufficient power from the action of pressing the switch that they are able to enable their transceiver and microprocessor for a short period. This period would probably not be sufficient for the exchange of tens or hundreds of messages.

Latency is also an important consideration—if a user presses a key and nothing happens for e.g. 3 seconds, he may press another button. This is likely to be more important for devices that need to join a network frequently, perhaps including point-of-sale applications.

Conversely, higher demands for security require more messages to be sent in order to decrease the probability of an attacker being successful. The conflicting demands of higher security and low operating power/latency cannot be met adequately by the available systems.

SUMMARY OF THE INVENTION

It is an object of the present invention to provide an enhanced cryptographic secret key distribution scheme which provides flexibility in terms of the above-mentioned conflicting demands. The invention is defined by the independent claims. The dependent claims define advantageous embodiments. The invention provides a system for transmitting or receiving encrypted data using a cryptographic secret key, in which a setting function is provided for setting an iteration number; and a number of messages to be exchanged during generating the cryptographic secret key, is controlled based on the iteration number.

Accordingly, one or both of the nodes, devices, transmission sides or transmission ends may vary, decide or influence the number of messages transferred during the generation of a cryptographic secret key. This renders the present invention much more adaptable to needs than the prior art of WO 2007/031089, according to which the iteration is simply set according to key length.

In the present invention, the term "setting unit" is to be understood within the context of the application text. This means that the setting unit can be any unit or functionality which effectively sets the iteration number. It may be implemented in a variety of manners, e.g. by setting the iteration number autonomously (e.g. by generating a number (e.g. a (pseudo) random number) within a particular range), by reading a pre-determined number, and/or by setting the iteration number based on external input (e.g. by receiving an iteration number from another device).

According to a first implementation, the iteration number can be provided or generated in response to an initiation of a key establishment. Thus, a fast initiation of the key generation process can be ensured.

According to a second implementation, which could be combined with the first implementation, the iteration number can be generated based on an input operation provided at the key generation apparatus. This option provides flexibility to a user in that security and latency can be individually controlled, e.g. based on application requirements.

According to a third implementation, which may be combined with at least one of the first and second implementations, the iteration number can be generated based on a type of the encrypted data. Thus, security and/or latency can be automatically controlled based on the requirements of the type of encrypted data.

According to a fourth implementation, which may be combined with at least one of the first to third implementations, the iteration number can be received from another transmission side. According to a fifth implementation, which may be combined with at least one of the first to fourth implementations, the iteration number can be transmitted to another transmission side. Thereby, it can be ensured that both transmission sides use the same number of messages to generate the key.

According to a sixth implementation, which may be combined with at least one of the first to fifth implementations, a memory may be provided for storing the iteration value. This ensures that the iteration value remains available and does not get lost after receipt.

According to a seventh implementation, which may be combined with at least one of the first to sixth implementations, a counter may be provided for counting the number of messages to be exchanged during generating the cryptographic secret key.

According to an eighth implementation, which may be combined with at least one of the first to seventh implementations, the cryptographic secret key may be generated based on recorded received signal strength indicator values obtained from the number of messages to be exchanged.

According to a ninth implementation, which may be combined with at least one of the first to eighth implementations, the cryptographic secret key may be generated based on a combination of random numbers obtained from said number of messages to be exchanged. According to a specific implementation example, the combination may be a logic exclusive-or (XOR) combination.

According to a tenth implementation, which may be combined with at least one of the first to ninth implementations, the cryptographic secret key may be generated based on a transmission of subsequent cryptographic secret keys secured with a previous cryptographic secret key, and wherein the previous cryptographic secret key and the subsequent cryptographic secret keys are transmitted by using the number of messages to be exchanged. In an advantageous modification of the tenth implementation, the cryptographic secret keys may be transmitted on more than one transmission channel, to thereby further enhance security of key exchange.

According to an eleventh implementation, which may be combined with at least one of the first to tenth implementations, the apparatus may be arranged to concatenate a number of bits of said cryptographic secret key into groups, to compare each group with a set of sample symbols, to classify groups according to which is the most closely matching sample symbol, and to reject groups that could not be classified with confidence above a predetermined threshold. Thereby, small number of bit errors caused by noise can be avoided, and a shared secret can be better extracted from the shared data sets.

These and other aspects of the invention will be apparent from and elucidated with reference to the embodiments described hereinafter.

DETAILED DESCRIPTION OF EMBODIMENTS

In the following, various embodiments of the present invention are described on the basis of a key distribution between a remote control device and a TV device.

The embodiments are directed to modifications of either or both of the two initially described approaches (and/or their variants) to permit one or both of the participating nodes to vary the number of messages transferred. However, the invention is not limited to these approaches and may be applied to any key distribution mechanism.

As an implementation example, a TV remote control powered from a small solar panel might permit a maximum of e.g. 5 messages to be exchanged during key establishment. This would provide lower security than a typical device, but would allow the exchange to complete before power was exhausted.

As a further implementation example, a TV and a digital versatile disk (DVD) player establishing a secure relationship might exchange e.g. 1000 messages, as power efficiency is less important and resistance to a security compromise might be more important.

An implementation based on a wireless protocol could define the range of valid values for a number N of messages transferred. Typical values of N might range from 0 to 1000.

For the above RSSI based first approach, setting N=0 would result in the "shared secret" being NULL. Using this shared secret to transport a 128-bit key would be equivalent to sending the key in the clear.

For the XOR based second approach, setting N=1 would also be functionally equivalent to sending the key in the clear.

The first embodiment is directed to an implementation using RSSI-based generation of a shared secret.

Figure 1:
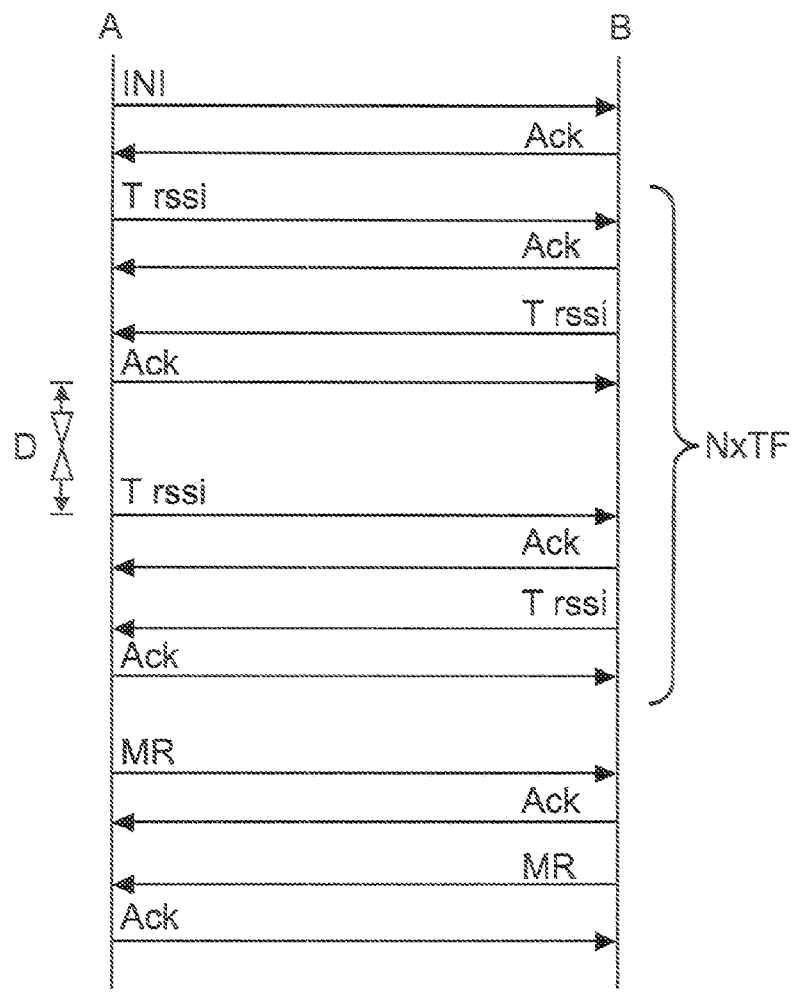
FIG. 1 shows a signaling diagram of an RSSI-based random number generation according to a first embodiment.

FIG. 1 shows a signaling diagram of an RSSI-based key establishment mechanism according to a first embodiment. A first node or device A (e.g. a remote control) initiates communication with a second node or device B (e.g. a TV). Each device is permitted to carry out the key exchange protocol through some user interaction. For example a user presses a button on the second device B and then on the first device A, or vice versa. In a first step, the first device A sends an initiating message INI, including an indication of the number N of messages to exchange. Then, in a second step, the second device B sends an acknowledgement Ack, and in a third step the first device A sends a test RSSI message T_rssi containing no payload. In a fourth step, the second device B records the RSSI of the received test RSSI message T_rssi received from the first device A and sends an acknowledgement Ack. In a fifth step, the second device B sends a test RSSI message T_rssi, containing no payload. In a sixth step, the first device A records the RSSI of the received test RSSI message T_rssi and sends an acknowledgement Ack. Then, after a short delay D, the third to sixth steps are repeated until each node has sent and received N messages.

Readings above a predetermined threshold T are classified as "1" and those below that threshold T are classified as "0". Then, "marginal" RSSI readings are identified and a bit field of marginal bits is created. In a seventh step, the first device A constructs and sends a marginal readings message MR containing the bit field of marginal bits. In an eighth step, the second device B sends an acknowledgement Ack. Then, in a ninth step, the second device B constructs and sends a marginal readings message MR containing a bit field of marginal bits. In a final tenth step, the first device A sends an acknowledgement Ack.

Now, both devices A and B combine the two bit fields of marginal bits e.g. by a logical OR combination, and all RSSI samples considered marginal are rejected by either device. The remaining, non-marginal, bits are concatenated into a shared secret. Optionally, this shared secret could be used to transport a random number from the first device A to the second device B. The key can be verified as per other key exchange algorithms.

If messages are not received as expected, the transmission ends may timeout and abort the process, and the user may have to retry later.

Possible frame formats for the above message exchange could be arranged as follows:

Format of Initiate Message INI:

| Bytes: variable | 2 | 2 |
|---|---|---|
| Header information | N | Checksum |

Format of Acknowledgement Message Ack:

| Bytes: variable | 2 |
|---|---|
| Header information | Checksum |

Format of Test RSSI Message T_rssi:

| Bytes: variable | 2 |
|---|---|
| Header information | Checksum |

Format of Marginal Bits Message:

| Bytes: variable | Variable | 2 |
|---|---|---|
| Header information | Marginal Bits | Checksum |

After the short delay D both devices A and B have a set of RSSI values. The two sets are correlated, but generally not identical, as illustrated below.

Figure 2:
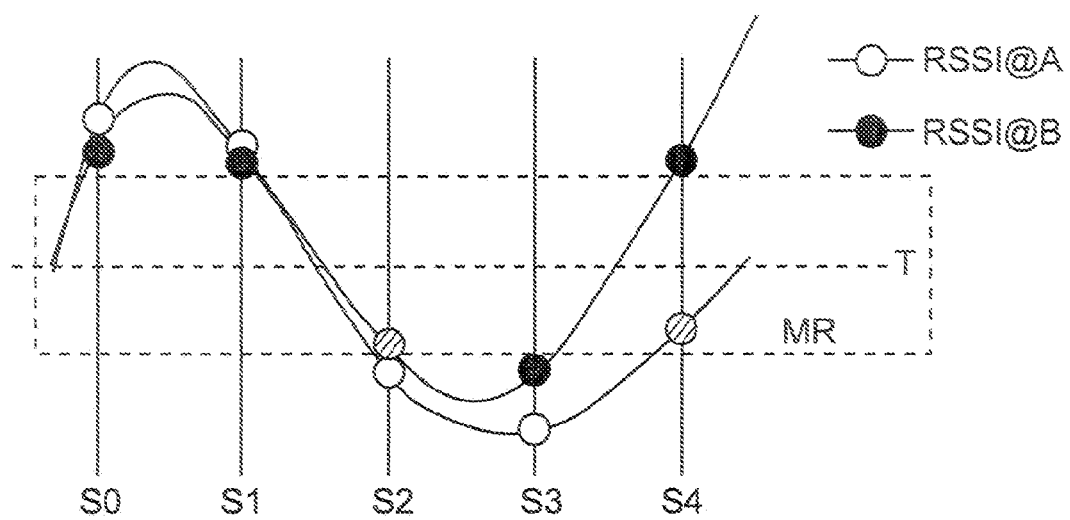
FIG. 2 shows a schematic diagram indicating typical RSSI values received at different transmission sides.

FIG. 2 shows a schematic diagram indicating typical RSSI values received at different transmission sides, e.g. at the devices A and B. Each RSSI sample is categorized as "1" (if above the threshold T) and as "0" (if below the threshold T). Samples in the marginal region MR are flagged as "marginal". These flagged RSSI samples are depicted as hatched circles, while black circles indicate RSSI samples received at the second device B and white circles indicate RSSI samples received at the first device A. The protocol rejects all samples flagged as marginal by either of the devices A and B. In the above example of FIG. 2, both device A and device B agree on all the non-rejected samples, and have a shared secret of value "0b110".

It should be noted that various other algorithms could be used for extracting a shared secret from two correlated data sets. The above is given as a straightforward example.

One other example could be the use of signal variation, e.g.: 1=getting stronger, 0=getting weaker. Some algorithms are able to extract more than one bit of data from each message exchanged, for example by having three threshold lines between high, upper, lower, bottom levels. A further algorithm which may be applied involves concatenation of a number of bits into groups, and comparison of each group with a set of sample "symbols". Groups can be classified according to which is the most closely matching sample symbol. Groups with marginal classifications (i.e. groups that could not be classified with confidence above a predetermined threshold) at either side are rejected by both sides in a similar way to bit classifications. This helps to avoid a small number of bit errors caused by noise, and allows more efficient extraction of a shared secret from the shared data sets.

These and other algorithms would also benefit in the same way from the ability to vary the number N of messages exchanged.

Figure 3:
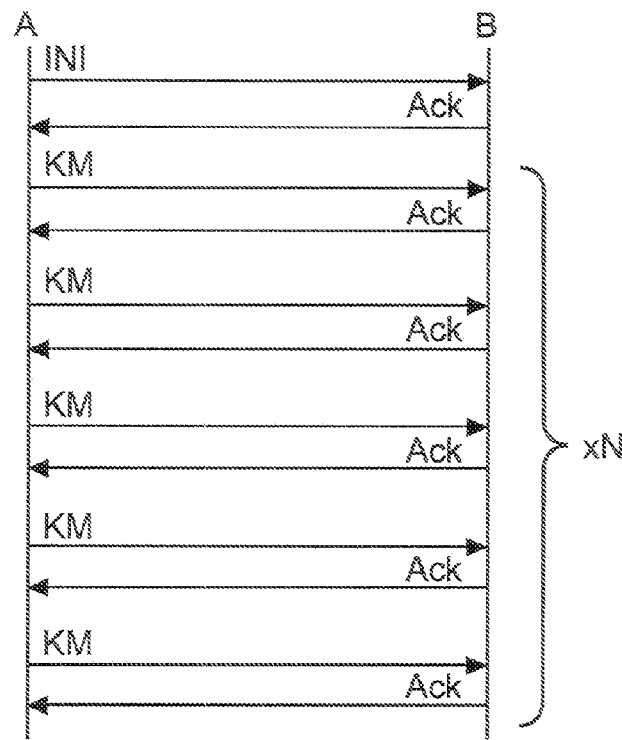
FIG. 3 shows a signaling diagram of a transmission of multiple keys with subsequent combination according to a second embodiment.

FIG. 3 shows a signaling diagram of a transmission of multiple keys with subsequent combination (e.g. XOR) according to a second embodiment. In the second embodiment, a first device A (e.g. a remote control device) initiates communication with a second device B (e.g. a TV). Each device is permitted to carry out a key exchange protocol through some user interaction, for example the user presses a button on the second device B then on the first device A, or vice versa.

In a first step, the first device A sends an initiating message INI, including an indication of the number N of messages to exchange. Then, in a second step, the second device B sends an acknowledgement Ack. In a third step, the first device A generates a 128-bit random number, constructs a key material message KM containing that number, and sends the key material message KM to the second device B, optionally using a reduced transmission power. In a fourth step, the second device B records the random number in the message received from the first device A and sends an acknowledgement Ack. The third and fourth steps are repeated until the first device A has sent N messages.

Then, both devices A and B combine a number "0" in a logical XOR manner with each random number sent and received in turn. Thus, the two devices A and B now share a shared secret. The obtained key can then be verified as per other key exchange algorithms.

If a device fails to receive an acknowledgement Ack to a given frame, then it may retry it e.g. in accordance with the Media Access Control (MAC) protocol. If all retries of any frame fail, the transmitter may abort the process and the receiver may eventually timeout and also abort the process. The user may then retry later.

Possible frame formats for the above message exchange could be arranged as follows:

Format of Initiating Message INI:

| Bytes: variable | 2 | 2 |
|---|---|---|
| Header information | N | Checksum |

Format of Acknowledgement Message Ack:

| Bytes: variable | 2 |
|---|---|
| Header information | Checksum |

Format of Key Material Message KM:

| Bytes: variable | 16 (=128 bits) | 2 |
|---|---|---|
| Header information | Key material | Checksum |

The above procedure of the second embodiment may be modified in that an initial key is sent in the clear, and, after this, the next key is sent secured by the previous key. This is repeated a fixed or variable number of times. Again an attacker missing any single message will not have the final key.

As a further modification the channel may be changed between transmissions of the separate keys. This makes it harder for an attacker to capture all the required keys if they are equipped only with a simple radio snooper device, as these typically operate on a single channel.

Figure 4:
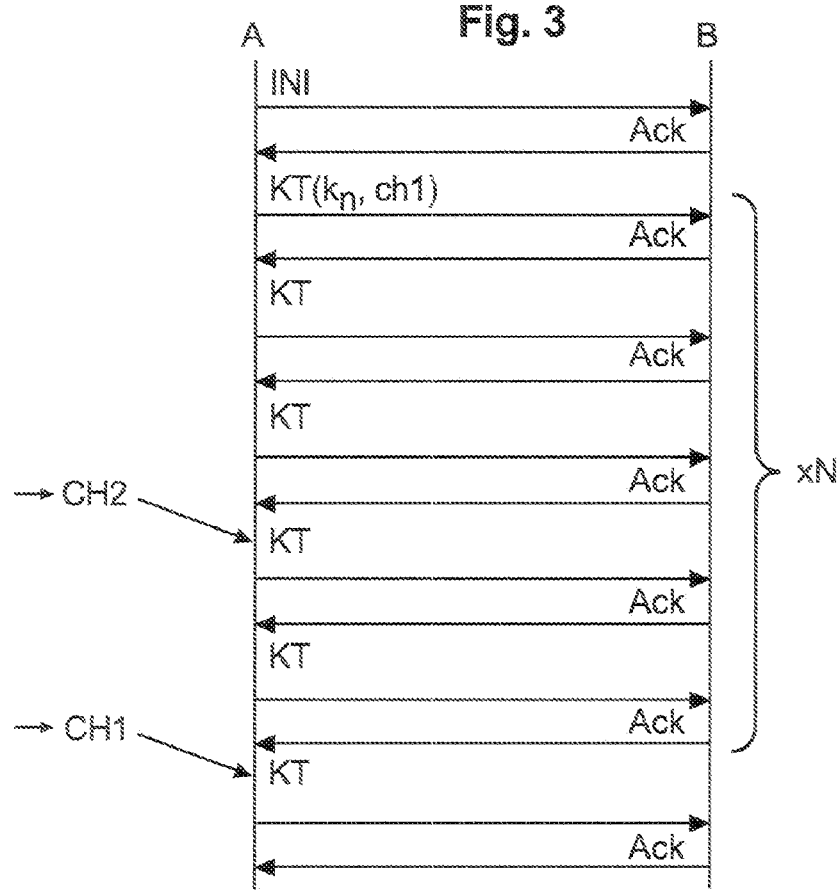
FIG. 4 shows a signaling diagram of a transmission of keys secured with a previous key on more than one channel, according to a third embodiment.

FIG. 4 shows a signaling diagram of a transmission of keys secured with a previous key on more than one channel, according to a third embodiment. Again, a first device A (e.g. a remote control) initiates communication with a second device B (e.g. a TV). Each of the devices A and B may be permitted to carry out a key exchange protocol through some user interaction, for example the user presses a button on the second device B then on the first device A, or vice versa.

In a first step, the first device A sends an initiating message INI, including an indication of the number N of messages to exchange. Then, in a second step, the second device B sends an acknowledgement Ack. In a third step, the first device A generates a 128-bit random key kn, selects a new channel at random, constructs a key transport message KT containing the key kn and the number ch1 of the new channel, and sends the message to the second device B, optionally using a reduced transmission power. It then waits for an acknowledgement Ack and switches to the new channel.

In a fourth step, the second device B records the key in the message received from the first device A, sends an acknowledgement Ack, and switches to the new channel. In a fifth step, the first device A generates another 128-bit random key, selects a further new channel at random, constructs a key transport message KT containing the key and the number ch2 of the new channel, secures it using the previously transported key, and sends the message to the second device B, optionally using a reduced transmission power. It then waits for an acknowledgement Ack and switches to the new channel.

In a sixth step, the second device B sends an acknowledgement Ack and then checks if the received command was appropriately secured. If it was appropriately secured, then it removes the security from the message and then extracts the new key from the message and records it. It then switches to the new channel.

The fifth and sixth steps are repeated until the first device A has sent N key transport messages. The current key can be verified as per other key exchange algorithms and used for future communications. If a device fails to receive an acknowledgement Ack to a given frame, then it may retry it in accordance with the MAC protocol. If all retries of any frame fail, the transmitter may abort the process and the receiver may eventually timeout and also abort the process. The user may then retry later.

Possible frame formats for the above message exchange could be arranged as follows:

Format of Initiating Message INI:

| Bytes: variable | 2 | 2 |
|---|---|---|
| Header information | N | Checksum |

Format of Acknowledgement Message Ack:

| Bytes: variable | 2 |
|---|---|
| Header information | Checksum |

Format of Key Transport Message KT:

| Bytes: variable | Variable | 16 (=128 bits) | 1 | Variable | 2 |
|---|---|---|---|---|---|
| Header information | Security header (Optional) | New key | New channel | Security footer (Optional) | Checksum |

Other implementation variations are possible. For example, the channel might be changed according to some prearranged schedule, such as sequential channels or a pseudo-random sequence.

Furthermore, key verification may carried out by sending messages secured with that key between the two devices A and B, and checking on reception that the message from the other was secured correctly.

Figure 5:
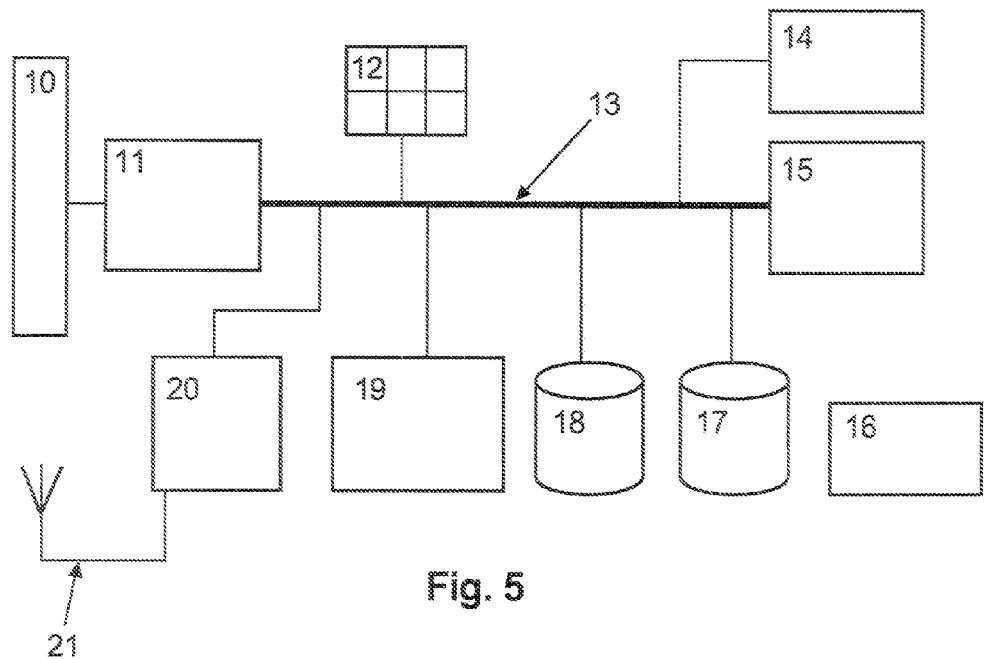
FIG. 5 shows a schematic block diagram of a television (TV) device of a key distribution system in which the embodiments can be implemented.

FIG. 5 shows a schematic block diagram of a TV device of a key distribution system in which the embodiments of the present invention can be implemented. The TV device comprises a screen or display (e.g. liquid crystal display (LCD) or the like) 10, a display driver 11, a front panel keypad 12 with control buttons, other audio and video inputs 14, a tuner 15, a power supply 16, a volatile memory (e.g. random access memory (RAM)) 17, a non-volatile memory (e.g. flash memory) 18, a central processing unit (CPU) 19, and a transceiver 20 to which an antenna 21 is connected. An interconnection between various of the above components is achieved by a communication line (e.g. system bus) 13.

In operation, media data comes in via the tuner 15 and the other audio/video inputs 14. The media data is output to the display 10 via the display driver 11. The interface between the display 10 and the display driver 11 may also be used for control and configuration of the TV settings. The CPU 19 runs control software and may provide mechanisms of the embodiments of the present invention. The transceiver 20 might run the for example the IEEE 802.15.4 MAC protocol. It may also implement the IEEE 802.15.4 PHY layer protocol. The front panel keypad 12 may have a button as referred to in the embodiments for initiation of key establishment. The memories 17 and 18 can be used for storing the control software and also for implementing the IEEE 802.15.4 stack.

Figure 6:
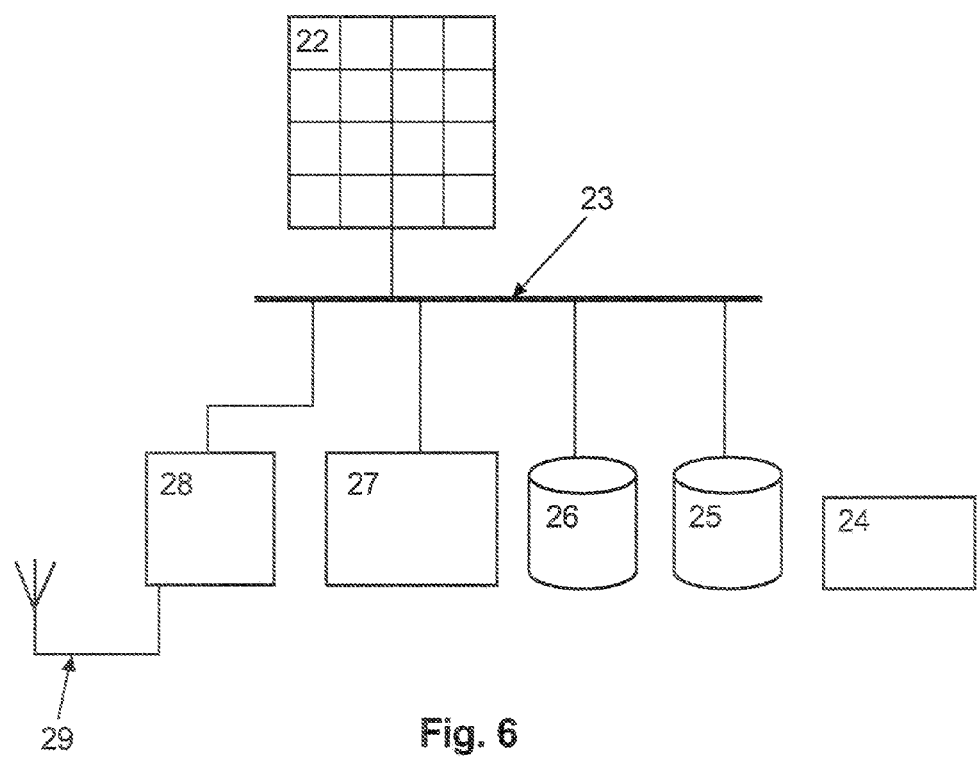
FIG. 6 shows a schematic block diagram of a remote control device of the key distribution system in which the embodiments can be implemented.

FIG. 6 shows a schematic block diagram of a remote control device of the key distribution system in which the embodiments of the present invention can be implemented.

The remote control device comprises a keypad 22 with control buttons, a power supply 24, a volatile memory (e.g. random access memory (RAM)) 25, a non-volatile memory (e.g. flash memory) 26, a central processing unit (CPU) 27, and a transceiver 28 to which an antenna 29 is connected. An interconnection between various of the above components is achieved by a communication line (e.g. system bus) 23.

The keypad 22 represents the buttons the user might press. It may include a button to initiate key establishment, as described in the embodiments of the present invention. The CPU 27 runs control software and may provide mechanisms of the embodiments of the present invention. The transceiver 28 might run the IEEE 802.15.4 MAC protocol. It may also implements the 802.15.4 PHY layer protocol. The memories 25 and 26 can be used for the control software and also for implementing the IEEE 802.15.4 stack.

Figure 7:
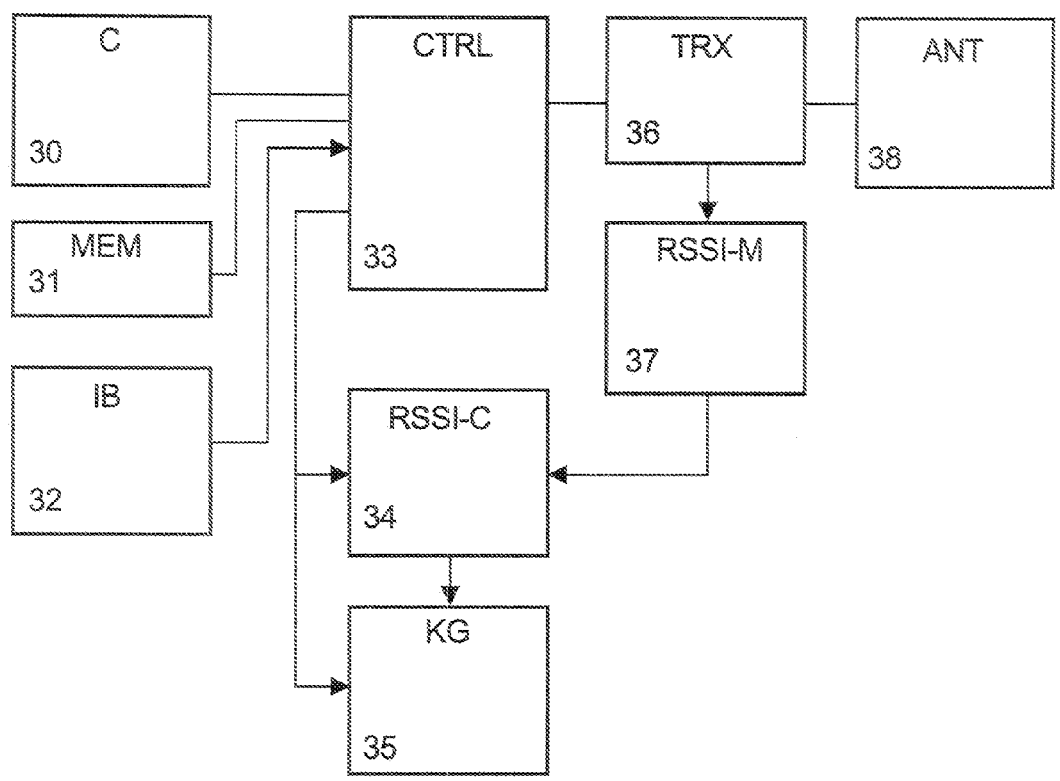
FIG. 7 shows a schematic block diagram of a hardware implementation at both transmission ends of an RSSI-based random number generation system according to a fourth embodiment.

FIG. 7 shows a schematic block diagram of a hardware implementation at both transmission ends of an RSSI-based random number generation system according to a fourth embodiment. The blocks depicted in FIG. 7 may be implemented as discrete hardware circuits implemented in a module, arranged on a circuit board, or integrated on a single or multiple chip device. A control logic (CTRL) 33 which may be realized as a software-controlled CPU or as a discrete logic circuit has access to a counter (C) 30 and a memory (MEM) 31, and can be controlled by an initiating button (IB) 32. The control logic 33 stores the transmitted value of the number N of permitted iterations in the memory 31 and controls the counter 30 to count the number of received or transmitted messages during key establishment. Based on a comparison of the count value at the counter 30 and the value of the number N stored in the memory 31, the control logic 33 can determine when the permitted number of iterations has been reached. Furthermore, the control logic 33 controls an RSSI categorization circuit or block (RSSI-C) 34 and a key generation circuit or block (KG) 35 which receives information from the RSSI categorization block 34. Input/output signals are received/transmitted via a transceiver (TRX) 36 and an antenna 38. An RSSI measurement circuit or block (RSSI-M) 37 received RSSI samples from the transceiver 36, measures them, and forwards measurement results to the RSSI categorization block 34. RSSI samples received by the transceiver are compared to the predetermined threshold T at the RSSI categorization block 34 which categorizes the measurement results similar to the procedure described above in connection with FIGS. 1 and 2. Based on the categorization of the N RSSI samples, the key generation block 35 generates the shared secret.

Figure 8:
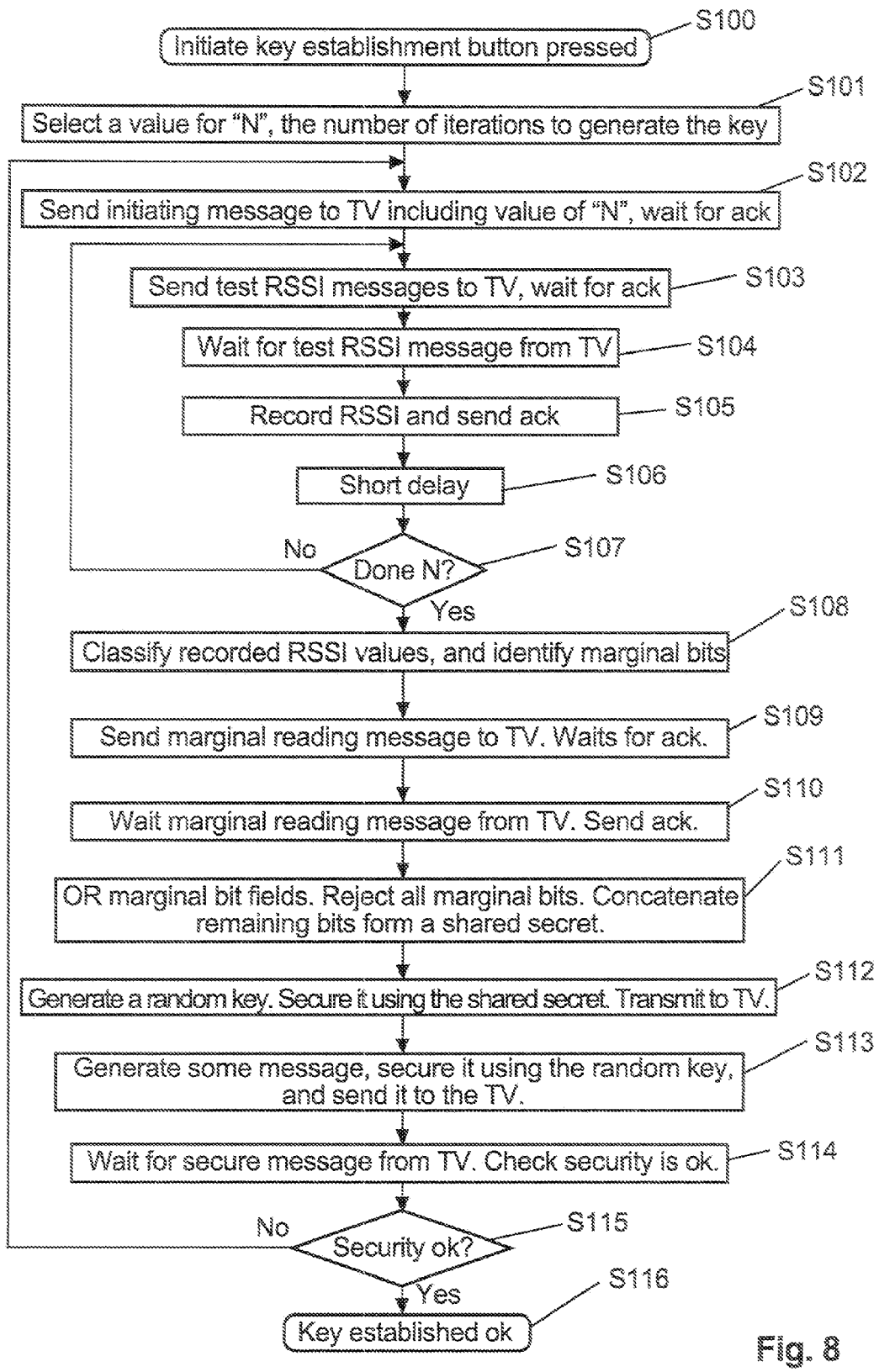
FIG. 8 shows a flow diagram of a key distribution procedure at a remote control side of an RSSI-based random number generation system according to a fifth embodiment.

FIG. 8 shows a flow diagram of a key distribution procedure at a remote control side of an RSSI-based key establishment system according to a fifth embodiment. The procedure of FIG. 8 may be implemented as a software routine controlling e.g. the CPU 27 of FIG. 6.

In step S100 the initiation button for key establishment is pressed on the remote control device. Then, in step S101, a value for the iteration number or number N of messages used to generate the encryption key or secret key is selected. This may be achieved based on the type of data to be encrypted (e.g. the specific application of the secured transmission), or an individual user, manufacturer, or operator setting. In step S102, an initiating message including the selected value of the number N is sent to a TV to be controlled by the remote control device, and the remote control device then waits for an acknowledgement from the TV. In the subsequent step S103, the remote control device sends a test RSSI (e.g. "T_rssi" in FIG. 1) message to the controlled TV and waits for an acknowledgement. Then, in step S104 it waits for a test RSSI message from the controlled TV. Thereafter, in step S105, it records the received RSSI sample and sends an acknowledgement. After a short delay in step S106, the remote control device checks in step S107 if the signaled number N of messages have been received. If the number N of messages have not been received yet, the procedure jumps back to step S103 in order to send the next test RSSI message. Otherwise, if the number N of messages have been received, the recorded RSSI samples or values are classified and marginal bits are identified in step S108. Then, in step S109, a marginal reading message is sent to the controlled TV and it is waited for an acknowledgement. In the subsequent step S110, the remote control device waits for a marginal reading message from the controlled TV and sends an acknowledgement after receipt thereof. In step S111 the marginal bit fields are OR-combined and all marginal bits are rejected. Additionally, the remaining non-marginal bits are concatenated to form the shared secret. In step S112, a random key is generated, secured by using the shared secret, and sent to the controlled TV. In step S113, the remote control device generates some message, secures it using the random key, and sends it to the controlled TV. Then, in step S114, the remote control device waits for a secure message from the controlled TV, and checks if the security of this received message is ok. If it determines in step S115 that the security is not ok, the procedure jumps back to step S102 in order to send a new initiating message. Otherwise, if it is determined in step S115 that the security is ok, it is concluded in step S116 that key establishment is finalized.

Figure 9:
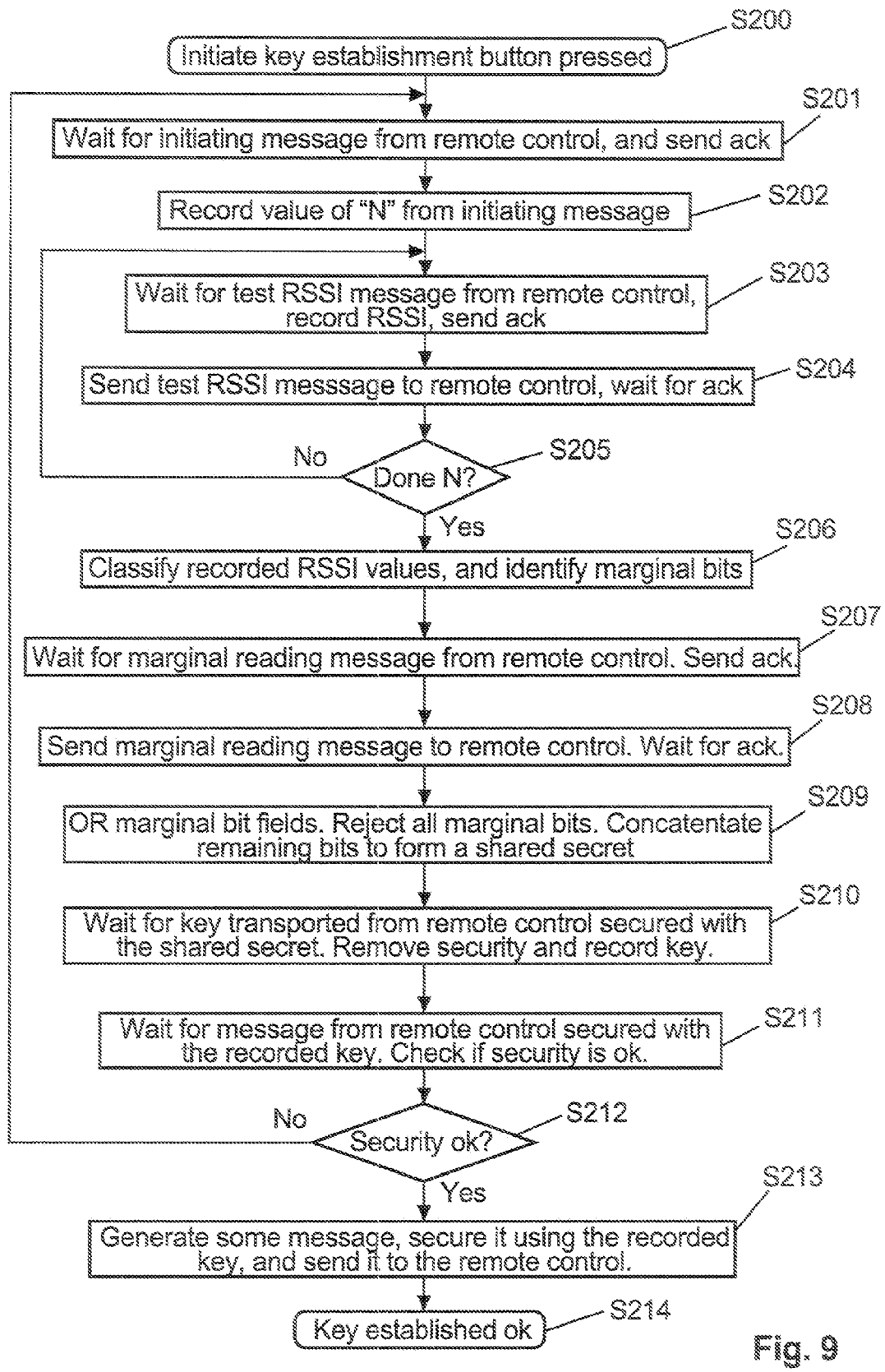
FIG. 9 shows a flow diagram of a key distribution procedure at a TV side of the RSSI-based random number generation system according to the fifth embodiment.

FIG. 9 shows a flow diagram of a key distribution procedure at a TV side of the RSSI-based key establishment system according to the fifth embodiment. The procedure of FIG. 9 may be implemented as a software routine controlling e.g. the CPU 19 of FIG. 5.

In step S200 the initiation button for key establishment is pressed at the TV device. Then, in step S201, the TV device waits for an initiating message from the remote control device, and sends an acknowledgement after receipt thereof. In step S202 a received value for the iteration number or number N of messages is recorded in order to set the iteration number for key generation. In the subsequent step S203, the TV device waits for a test RSSI message, records an RSSI value after receipt thereof, and waits for an acknowledgement. In step S204, the TV device sends a test RSSI message to the remote control device and waits for an acknowledgement. Then, in step S205 the TV device checks if the signaled number N of messages have been received. If the number N of messages have not been received yet, the procedure jumps back to step S203 in order to wait for the next test RSSI message. Otherwise, if the number N of messages have been received, the recorded RSSI samples or values are classified and marginal bits are identified in step S206. Then, in step S207, the TV device waits for a marginal reading message sent by the remote control device and sends an acknowledgement after receipt thereof. In the subsequent step S208, the TV device sends a marginal reading message to the remote control device and waits for an acknowledgement. In step S209 the marginal bit fields are OR-combined and all marginal bits are rejected. Additionally, the remaining non-marginal bits are concatenated to form the shared secret. In step S210, the TV device waits for a message from the remote control secured with the shared secret, removes the security, and records the conveyed key. In step S211, the TV device waits for a message from the remote control device secured with the recorded key, and checks if the security of this received message is ok. If it determines in step S212 that the security is not ok, the procedure jumps back to step S201 in order to wait for a new initiating message. Otherwise, if it is determined in step S212 that the security is ok, the TV device generates in step S213 some message, secures it using the recorded key, and sends it to the remote control device. Then, it is concluded in step S214 that key establishment is finalized.

Figure 10:
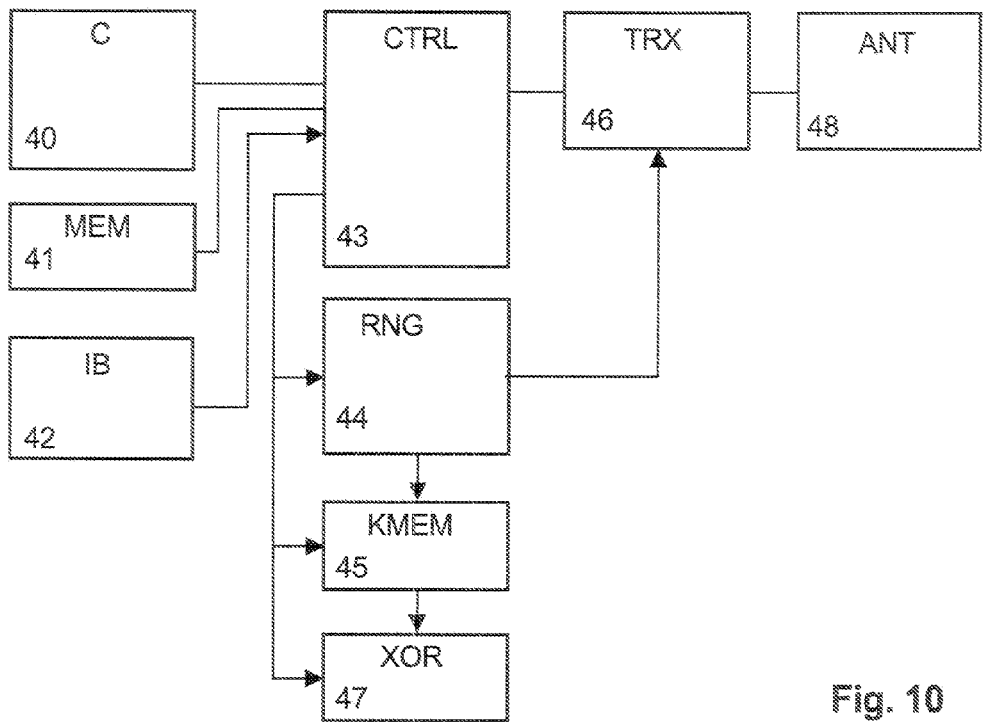
FIG. 10 shows a schematic block diagram of a hardware implementation at a remote control side of a multiple-key combination system according to a sixth embodiment.

FIG. 10 shows a schematic block diagram of a hardware implementation at a remote control side of a multiple-key combination system according to a sixth embodiment. The blocks depicted in FIG. 10 may be implemented as discrete hardware circuits implemented in a module, arranged on a circuit board, or integrated on a single or multiple chip device. A control logic (CTRL) 43 which may be realized as a software-controlled CPU or as discrete logical circuit has access to a counter (C) 40 and a memory (MEM) 41, and can be controlled by an initiating button (IB) 42. The control logic 43 stores the transmitted value of the number N of permitted iterations in the memory 41 and controls the counter 40 to count the number of received or transmitted messages during key establishment. Based on a comparison of the count value at the counter 40 and the value of the number N stored in the memory 41, the control logic 43 can determine when the permitted number of iterations has been reached. Furthermore, the control logic 43 controls a random number generation circuit or block (RNG) 44, a key storage or key memory (KMEM) 45 for keying material, and an XOR combination circuit or block 47 for key generation. Input/output signals are received/transmitted via a transceiver (TRX) 46 and an antenna 48. The random number generation block 44 generates random numbers and supplies them to the transceiver 46 for transmission to the controlled TV device. The generated and signaled random numbers are memorized or recorded in the key memory 45 and XOR-combined at the XOR combination block 47 to generate the shared secret.

Figure 11:
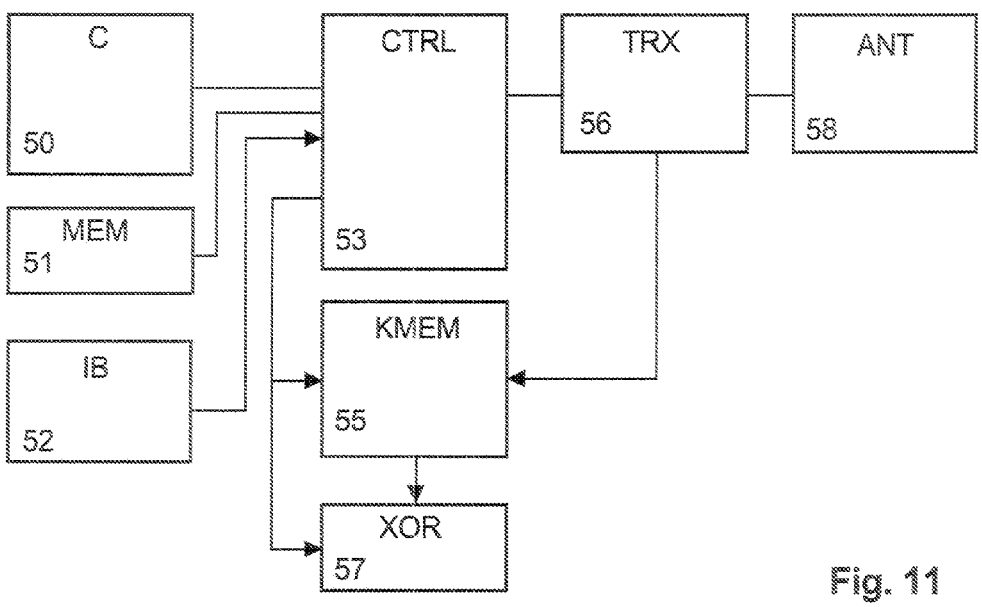
FIG. 11 shows a schematic block diagram of a hardware implementation at a TV side of the multiple-key combination system according to the sixth embodiment.

FIG. 11 shows a schematic block diagram of a hardware implementation at a TV side of the multiple-key combination system according to the sixth embodiment. The blocks depicted in FIG. 11 may be implemented as discrete hardware circuits implemented in a module, arranged on a circuit board, or integrated on a single or multiple chip device. A control logic (CTRL) 53 which may be realized as a software-controlled CPU or as discrete logical circuit has access to a counter (C) 50 and a memory (MEM) 51, and can be controlled by an initiating button (IB) 52. The control logic 53 stores the received value of the number N of permitted iterations in the memory 51 and controls the counter 50 to count the number of received or transmitted messages during key establishment. Based on a comparison of the count value at the counter 50 and the value of the number N stored in the memory 51, the control logic 53 can determine when the permitted number of iterations has been reached. Furthermore, the control logic 53 controls a key storage or key memory (KMEM) 55 for keying material, and an XOR combination circuit or block 57 for key generation. Input/output signals are received/transmitted via a transceiver (TRX) 56 and an antenna 58. Random numbers received by the transceiver 56 from the remote control device are memorized or recorded in the key memory 55 and XOR-combined at the XOR combination block 57 to generate the shared secret.

Figure 12:
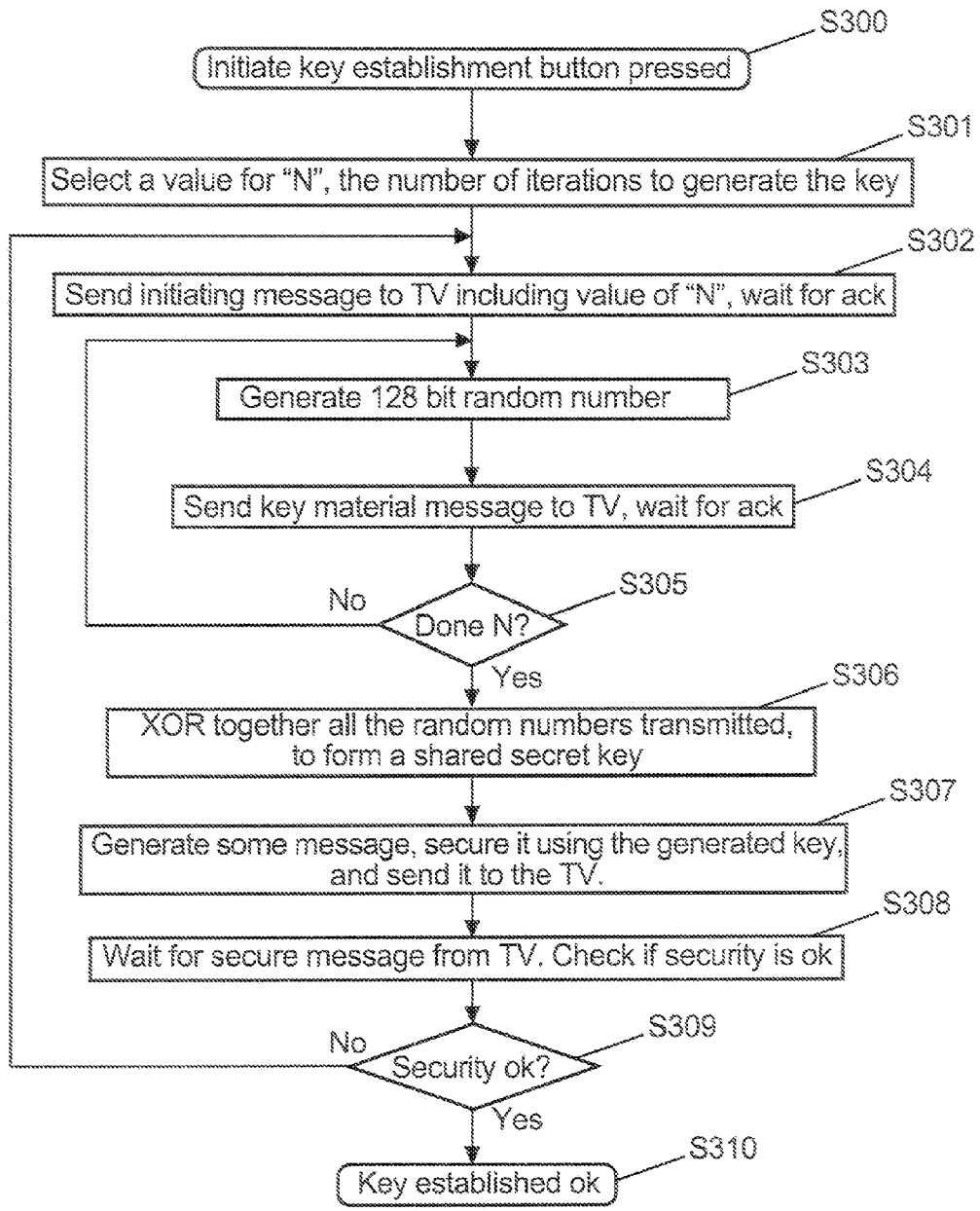
FIG. 12 shows a flow diagram of a key distribution procedure at a remote control side of a multiple-key combination system according to a seventh embodiment.

FIG. 12 shows a flow diagram of a key distribution procedure at a remote control side of a multiple-key combination system according to a seventh embodiment. The procedure of FIG. 12 may be implemented as a software routine controlling e.g. the CPU 27 of FIG. 6.

In step S300 the initiation button for key establishment is pressed on the remote control device. Then, in step S301, a value for the iteration number or number N of messages used to generate the encryption key or secret key is selected. This may be achieved based on the type of data to be encrypted (e.g. the specific application of the secured transmission), or an individual user, manufacturer, or operator setting. In step S302, an initiating message including the selected value of the number N is sent to a TV to be controlled by the remote control device, and the remote control device then waits for an acknowledgement from the TV. In the subsequent step S303, the remote control device generates a 128-bit random number, and sends it in step S304 in a key material message to the controlled TV and waits for an acknowledgement. Then, in step S305, the remote control device checks if the signaled number N of messages have been transmitted. If the number N of messages have not been transmitted yet, the procedure jumps back to step S303 in order to generate a new random number. Otherwise, if the number N of messages have been transmitted, the random numbers transmitted are XOR-combined in step S306 to form a shared secret key. In step S307, the remote control device generates some message, secures it using the generated key, and sends it to the controlled TV. Then, in step S308, the remote control device waits for a secure message from the controlled TV, and checks if the security of the received message is ok. If it determines in step S309 that the security is not ok, the procedure jumps back to step S302 in order to send a new initiating message. Otherwise, if it is determined in step S309 that the security is ok, it is concluded in step S310 that key establishment is finalized.

Figure 13:
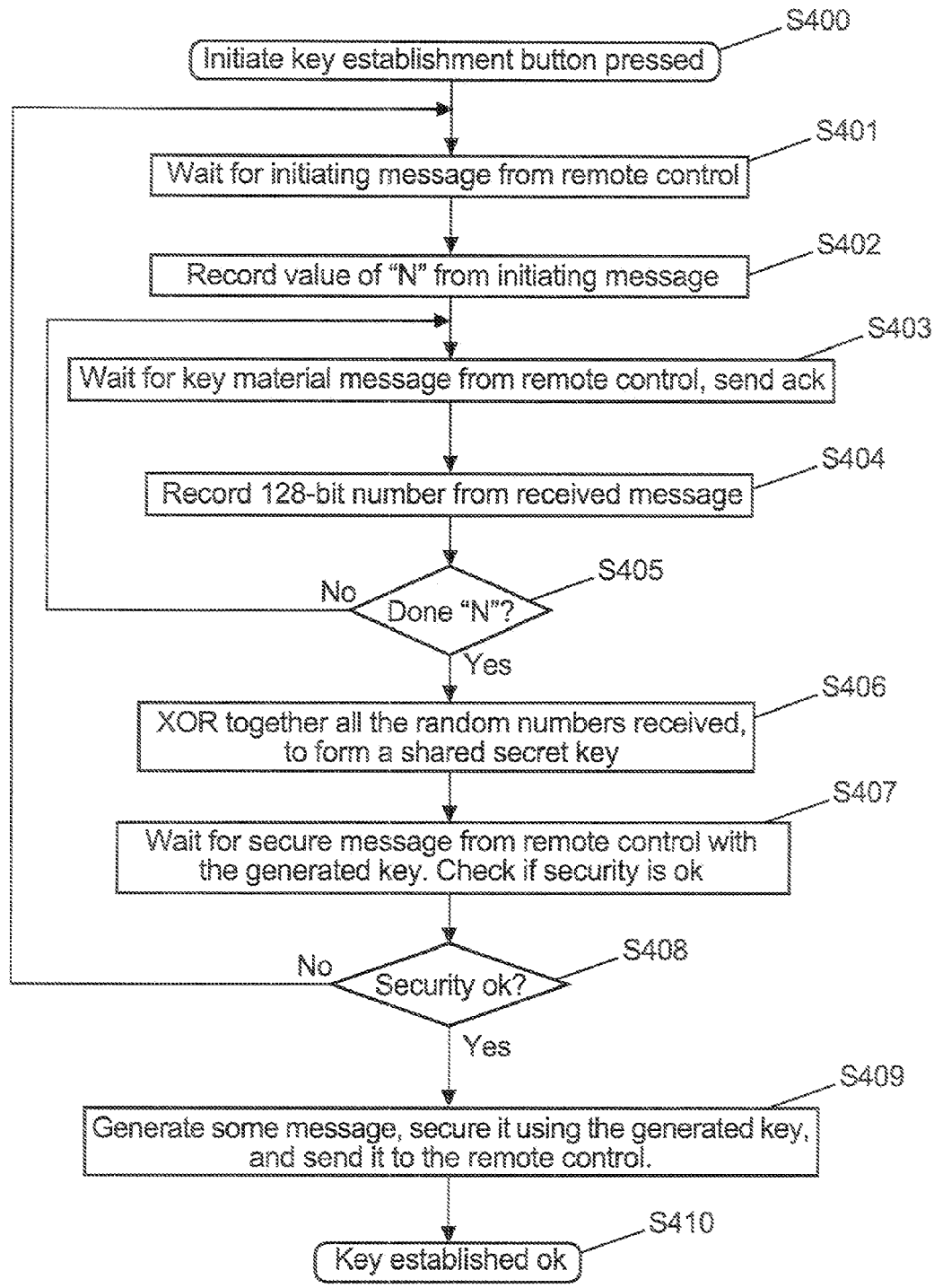
FIG. 13 shows a flow diagram of a key distribution procedure at a TV side of the multiple-key combination system according to the seventh embodiment.

FIG. 13 shows a flow diagram of a key distribution procedure at a TV side of the multiple-key combination system according to the seventh embodiment. The procedure of FIG. 13 may be implemented as a software routine controlling e.g. the CPU 19 of FIG. 5.

In step S400 the initiation button for key establishment is pressed at the TV device. Then, in step S401, the TV device waits for an initiating message from the remote control device. In step S402, a received value for the iteration number or number N of messages is recorded in order to set the iteration number for key generation. In the subsequent step S403, the TV device waits for a key material message from the remote control device and sends an acknowledgement after receipt thereof. Then, in step S404, the TV device records a 128-bit random number received from the remote control device. In step S405, the TV device checks if the signaled number N of messages have been received. If the number N of messages have not been transmitted yet, the procedure jumps back to step S403 in order to wait for a new key material message. Otherwise, if the number N of messages have been transmitted, the random numbers received are XOR-combined in step S406 to form a shared secret key. In step S407, the TV device waits for a secure message from the remote control device secured with the generated key, and checks if the security of the received message is ok. If it determines in step S408 that the security is not ok, the procedure jumps back to step S401 in order to wait for a new initiating message. Otherwise, if it is determined in step S408 that the security is ok, the TV device generates in step S409 some message, secures it using the generated key, and sends it to the remote control device. Then, it is concluded in step S410 that key establishment is finalized.

Figure 14:
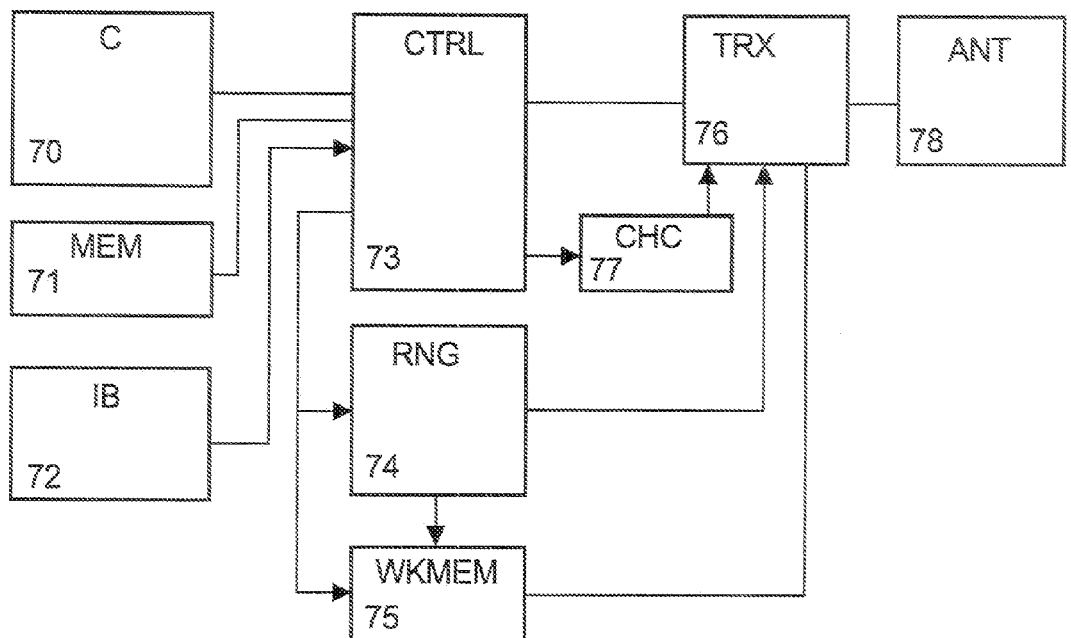
FIG. 14 shows a schematic block diagram of a hardware implementation at a remote control side of a secured multiple-channel multiple-key transmission system according to an eighth embodiment.

FIG. 14 shows a schematic block diagram of a hardware implementation at a remote control side of a secured multiple-channel multiple-key transmission system according to an eighth embodiment. The blocks depicted in FIG. 14 may be implemented as discrete hardware circuits implemented in a module, arranged on a circuit board, or integrated on a single or multiple chip device. A control logic (CTRL) 73 which may be realized as a software-controlled CPU or as discrete logical circuit has access to a counter (C) 70 and a memory (MEM) 71, and can be controlled by an initiating button (IB) 72. The control logic 73 stores the transmitted value of the number N of permitted iterations in the memory 71 and controls the counter 70 to count the number of received or transmitted messages during key establishment. Based on a comparison of the count value at the counter 70 and the value of the number N stored in the memory 71, the control logic 73 can determine when the permitted number of iterations has been reached. Furthermore, the control logic 73 controls a random number generation circuit or block (RNG) 74 and a working key storage or working key memory (WK-MEM) 75 for a working key. Input/output signals are received/transmitted via a transceiver (TRX) 76 and an antenna 78. The random number generation block 74 generates random numbers and supplies them to the transceiver 76 for transmission to the controlled TV device. The generated and signaled random numbers are memorized or recorded in the working key memory 75 to generate the shared secret. Additionally, the control logic 73 controls a channel change circuit or block 77 which controls the channel used by the transceiver 76 to transmit/receive output/input signals.

Figure 15:
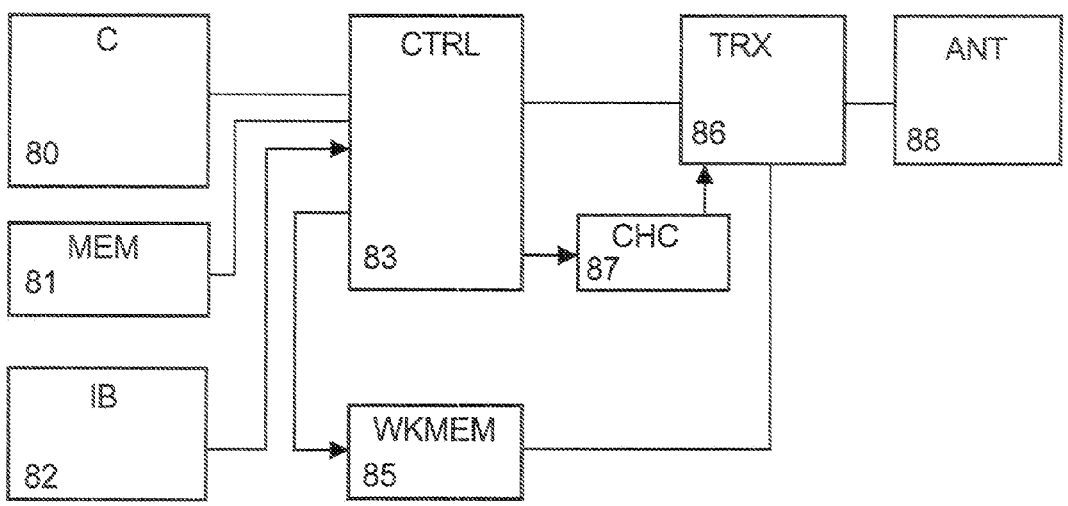
FIG. 15 shows a schematic block diagram of a hardware implementation at a TV side of the secured multiple-channel multiple-key transmission system according to the eighth embodiment.

FIG. 15 shows a schematic block diagram of a hardware implementation at a TV side of the secured multiple-channel multiple-key transmission system according to the eighth embodiment. The blocks depicted in FIG. 15 may be implemented as discrete hardware circuits implemented in a module, arranged on a circuit board, or integrated on a single or multiple chip device. A control logic (CTRL) 83 which may be realized as a software-controlled CPU or as discrete logical circuit has access to a counter (C) 80 and a memory (MEM) 81, and can be controlled by an initiating button (IB) 82. The control logic 83 stores the received value of the number N of permitted iterations in the memory 81 and controls the counter 80 to count the number of received or transmitted messages during key establishment. Based on a comparison of the count value at the counter 80 and the value of the number N stored in the memory 81, the control logic 83 can determine when the permitted number of iterations has been reached. Furthermore, the control logic 83 controls a key storage or key memory (WKMEM) 85 for a working key. Input/output signals are received/transmitted via a transceiver (TRX) 86 and an antenna 88. Random numbers or keys received by the transceiver 56 from the remote control device are memorized or recorded in the working key memory 85 to generate the shared secret. Additionally, the control logic 83 controls a channel change circuit or block 87 which controls the channel used by the transceiver 86 to transmit/receive output/input signals.

Figure 16:
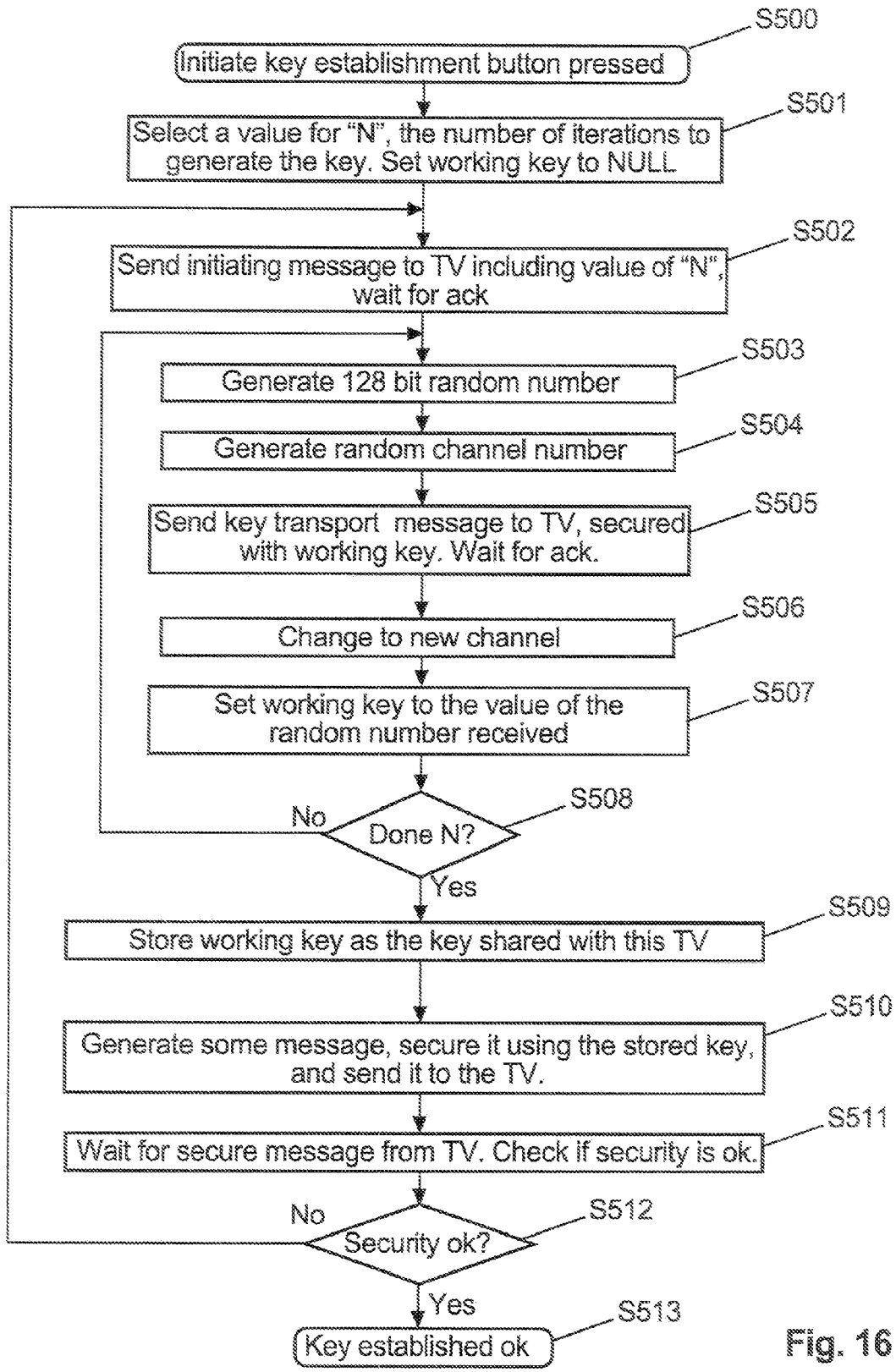
FIG. 16 shows a flow diagram of a key distribution procedure at a remote control side of a secured multiple-channel multiple-key transmission system according to a ninth embodiment.

FIG. 16 shows a flow diagram of a key distribution procedure at a remote control side of a secured multiple-channel multiple-key transmission system according to a ninth embodiment. The procedure of FIG. 16 may be implemented as a software routine controlling e.g. the CPU 27 of FIG. 6.

In step S500 the initiation button for key establishment is pressed on the remote control device. Then, in step S501, a value for the iteration number or number N of messages used to generate the encryption key or secret key is selected. This may be achieved based on the type of data to be encrypted (e.g. the specific application of the secured transmission), or an individual user, manufacturer, or operator setting. In step S502, an initiating message including the selected value of the number N is sent to a TV to be controlled by the remote control device, and the remote control device then waits for an acknowledgement from the TV. In the subsequent step S503, the remote control device generates a 128-bit random number, and in step S504 it generates a random channel number. Then, in step S505 the remote control device sends a key transport message secured with a working key to the controlled TV and waits for an acknowledgement. In the next step S506, the remote control device changes to the previously selected new channel. In step S507 it sets the working key to the value or pattern of the received random number, and then checks in step S508 if the signaled number N of messages have been transmitted. If the number N of messages have not been transmitted yet, the procedure jumps back to step S503 in order to generate a new random number. Otherwise, if the number N of messages have been transmitted, the working key is stored in step S509 as the key shared with this TV. In step S510, the remote control device generates some message, secures it using the stored key, and sends it to the controlled TV. Then, in step S511, the remote control device waits for a secure message from the controlled TV, and checks if the security of the received message is ok. If it determines in step S512 that the security is not ok, the procedure jumps back to step S502 in order to send a new initiating message. Otherwise, if it is determined in step S512 that the security is ok, it is concluded in step S513 that key establishment is finalized.

Figure 17:
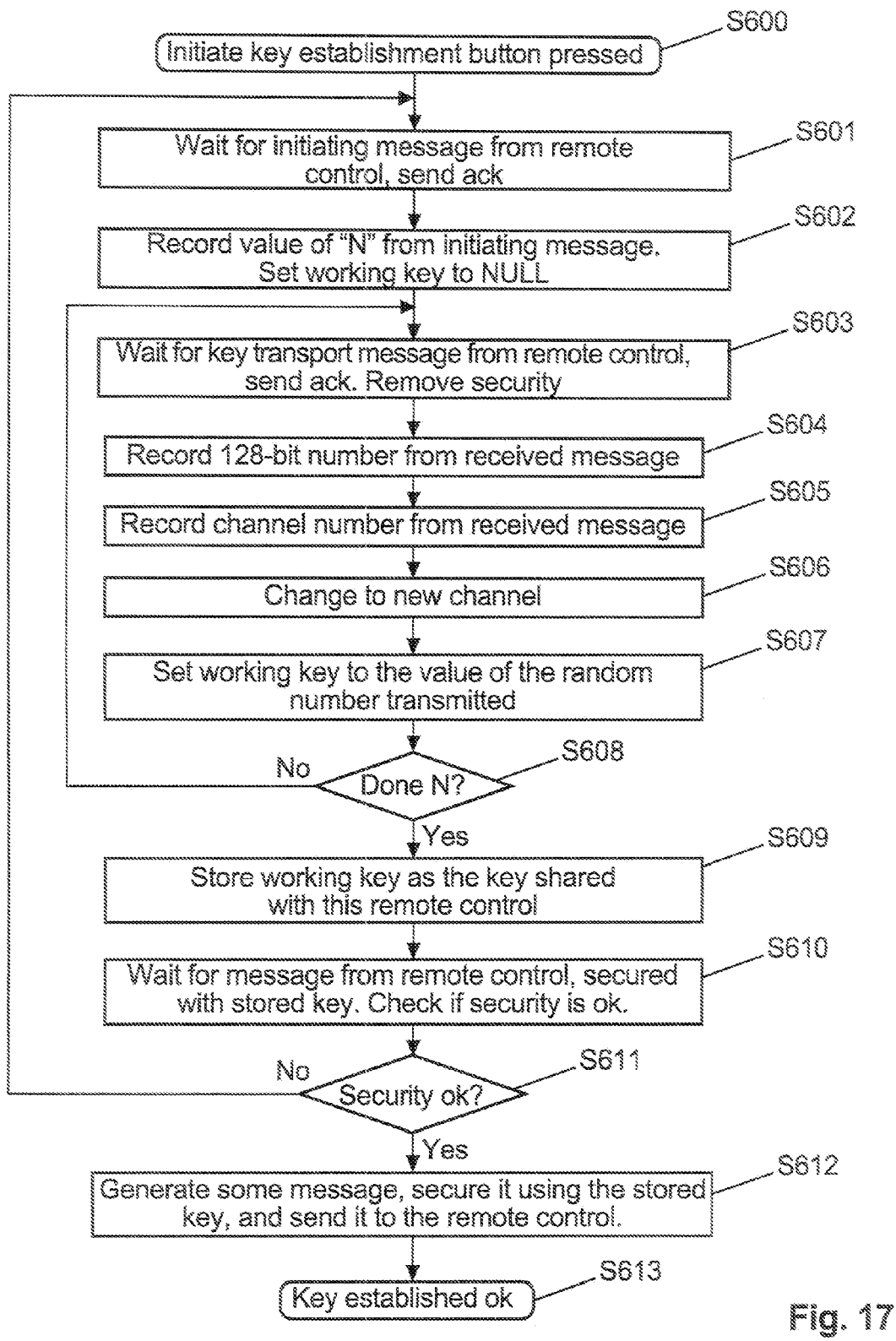
FIG. 17 shows a flow diagram of a key distribution procedure at a TV side of the secured multiple-channel multiple-key transmission system according to the ninth embodiment.

FIG. 17 shows a flow diagram of a key distribution procedure at a TV side of the secured multiple-channel multiple-key transmission system according to the ninth embodiment. The procedure of FIG. 17 may be implemented as a software routine controlling e.g. the CPU 19 of FIG. 5.

In step S600 the initiation button for key establishment is pressed at the TV device. Then, in step S601, the TV device waits for an initiating message from the remote control device. In step S602, a received value for the iteration number or number N of messages is recorded in order to set the iteration number for key generation. In the subsequent step S603, the TV device waits for a key transport message from the remote control device, sends an acknowledgement after receipt thereof, and removes security from the received message. Then, in step S604, the TV device records a 128-bit random number retrieved from the received message, and in step S605, the TV device records a channel number retrieved from the received message. Then, in step S606 the TV device changes to the new channel signaled from the remote control device, and sets in step S607 the working key to the value of the transmitted random number. In step S608, the TV device checks if the signaled number N of messages have been received. If the number N of messages have not been transmitted yet, the procedure jumps back to step S603 in order to wait for a new key transport message. Otherwise, if the number N of messages have been transmitted, the working key is stored in step S609 as the key shared with this remote control device. In step S610, the TV device waits for a secure message from the remote control device secured with the stored key, and checks if the security of a received message is ok. If it determines in step S611 that the security is not ok, the procedure jumps back to step S601 in order to wait for a new initiating message. Otherwise, if it is determined in step S611 that the security is ok, the TV device generates in step S612 some message, secures it using the stored key, and sends it to the remote control device. Then, it is concluded in step S613 that key establishment is finalized.

In summary, an apparatus and a method for performing cryptographic secret key distribution have been described, wherein a value for a number of iterations can be individually set, so that the number of messages to be exchanged during generating a cryptographic secret key can be varied based on the set value of the iteration number.

It is noted that the present invention is not restricted to the above embodiments and can be used for any key distribution scheme in any type of application, not only between a remote control device and a TV device, to provide a secure transport mechanism between devices in the network. Key management can be kept simple and transparent—thus minimizing the impact to the consumer experience.

In an LQI-based modification of the above RSSI-based embodiments, the same key may be generated on both devices, e.g. from dummy packets exchanged on the wireless or radio frequency (RF) link following the proposed signaling of the iteration number N. Acknowledged packets (of minimal data) are exchanged between devices, and the link quality is measured for every packet exchange. From the LQI variation over time, the key can be generated. The variation of the link quality over time could be "enhanced" by moving of at least one of the nodes or by changing the physical environment between the two devices.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. A single processor or other unit may fulfill the functions of FIGS. 7 to 17 and several items recited in the claims. The mere fact that certain measures are recited in mutually different dependent claims does not indicate that a combination of these measures cannot be used to advantage. A computer program used for controlling a processor to perform the claimed method features may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. An apparatus for transmitting or receiving data securely using a cryptographic secret key, said apparatus comprising:
a setting unit which provides a setting function for setting an iteration number, wherein a value for a number of iterations corresponding to the iteration number can be individually set; and
a key generation controller for controlling a number of messages to be exchanged during generating said cryptographic secret key, wherein the number of messages to be exchanged can be varied based on a set value of said iteration number, and wherein the messages comprise test RSSI (T_rssi) messages, marginal readings (MR) messages, key material (KM) messages or key transport (KT) messages.

2. The apparatus according to claim 1, wherein said setting unit is arranged to generate or provide said iteration number in response to an initiation of a key establishment.

3. The apparatus according to claim 1, wherein said setting unit is arranged to generate said iteration number based on an input operation at said apparatus.

4. The apparatus according to claim 1, wherein said setting unit is arranged to generate said iteration number based on a type of said data.

5. The apparatus according to claim 1, wherein said setting unit is arranged to receive said iteration number from another transmission side.

6. The apparatus according to claim 1, wherein said apparatus comprises a transmitter arranged to transmit said iteration number to another transmission side.

7. The apparatus according to claim 1, further comprising a memory for storing a value of said iteration number.

8. The apparatus according to claim 1, further comprising a counter for counting said number of messages to be exchanged during said generating said cryptographic secret key.

9. The apparatus according to claim 1, wherein said apparatus is arranged to generate said cryptographic secret key based on a combination of randomly generated numbers obtained from said number of messages to be exchanged.

10. The apparatus according to claim 9, wherein said combination is an exclusive-or combination.

11. A method for transmitting or receiving encrypted data using a cryptographic secret key, said method comprising:
  providing, via a setting unit, a setting function for setting an iteration number, wherein a value for a number of iterations corresponding to the iteration number can be individually set; and
  controlling, via a key generation controller, a number of messages to be exchanged during generating said cryptographic secret key, wherein the number of messages to be exchanged can be varied based on a set value of said iteration number, and wherein the messages comprise test RSSI (T_rssi) messages, marginal readings (MR) messages, key material (KM) messages or key transport (KT) messages.

12. A system for distributing a cryptographic secret key, said system comprising at least one first device having an apparatus according to claim 1 for transmitting said iteration number, and at least one second device for receiving said transmitted iteration number and for generating said cryptographic secret key based on said received iteration number.

13. A non-transitory computer-readable medium embodied with a computer program comprising code executable by a computer device for producing the steps of the method of claim 11 when run on the computer device.

* * * * *